(No Model.)

G. E. ELLIOTT.
GANG OF CIRCULAR SAWS.

No. 429,514. Patented June 3, 1890.

WITNESSES

INVENTOR
George E. Elliott.
by A. G. Heylmun
Attorney

UNITED STATES PATENT OFFICE.

GEORGE E. ELLIOTT, OF CALAIS, MAINE.

GANG OF CIRCULAR SAWS.

SPECIFICATION forming part of Letters Patent No. 429,514, dated June 3, 1890.

Application filed January 4, 1890. Serial No. 335,848. (No model.)

*To all whom it may concern:*

Be it known that I, GEORGE E. ELLIOTT, a citizen of the United States of America, residing at Calais, in the county of Washington and State of Maine, have invented certain new and useful Improvements in Gangs of Circular Saws, of which the following is a specification.

My invention has relation to improved means for hanging a gang of circular saws on an arbor common to all the saws; and the object is to provide improved means for adjusting the relation of one saw to another and the whole number or gang, so as to bring them closer together with more regularity, with greater certainty, more convenience, and with greater rigidity of bearings than heretofore accomplished.

Circular gang-saws when mounted and closely arranged on an arbor or shaft with collars between them acquire a buckling movement in their rotation, and the collars soon get loose and increase the rack or buckle of the gang. By my invention each saw is carried on a sleeve having comparatively an extended bearing-surface, which renders the mountings durable and steady, and at the same time the gang may be adjusted readily on the shaft.

I accomplish the object of my invention by means of the mechanism illustrated in the accompanying drawings, wherein—

Figure 1:
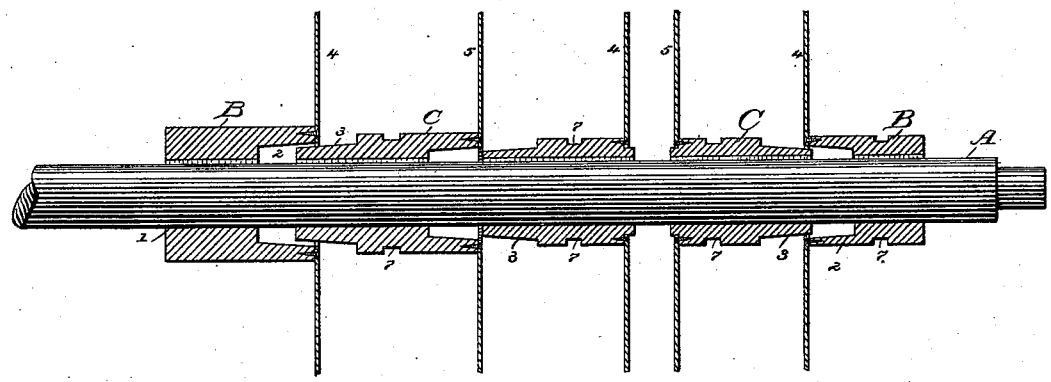
Figure 2:
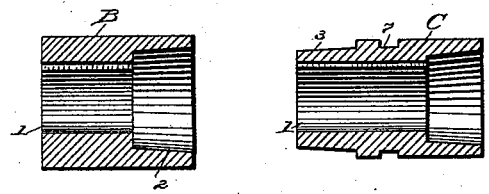

Figure 1 is a central longitudinal section of a number of my improved saw-hangers arranged on a shaft. Fig. 2 is a central longitudinal section of two of the sleeves removed from the shaft.

A designates the shaft which supports the saw hangers or sleeves. This is of the usual construction and is adapted in dimensions to meet whatever character of gang it is intended to mount thereon.

B designates the end sections of the sleeves, consisting of tubular sleeves cored to accurately fit the shaft for a portion of its length, as at 1, and then chambered out for the rest of its length at a greater diameter than the shaft, forming an annular projecting shell, as at 2.

C designates the adjoining or adjacent sleeve formed to fit the shaft and having a portion, as 3, turned down to fit in and telescope with the annular chamber of the other sleeve, substantially as shown in the drawings. It will be perceived that these sleeves may be moved on the shaft, so that the saws 4 5, secured on the sleeves, may be brought close together in practice. The sleeve may be fixed to the shaft by means of channels in the shaft and sleeves and keys driven tight in the ways, as shown, or they may be set tight by other well-known means. If it be desired to increase the number of the saws, the sleeves are both chambered and shouldered, as shown, and thus the series carried on to the end sleeve. In the face of each sleeve is an annular groove 7, which serves to receive the grip of a shifting-tool when the sleeve is loosened on the shaft and required to be shifted in its position.

The telescoping portions may be slightly tapered in order to enter and separate readily. The sleeve should not be shorter than three inches, and may be made longer by simply making the end sleeves longer and increasing the depth of the chamber and the length of the telescoping end of the adjacent sleeve. This construction gives an extended bearing-surface to the sleeve and yet permits the saws to be brought close together.

The saws are secured to the end of the sleeves by screws, as usual, and substantially as shown in the drawings in Fig. 1.

What I claim as my invention is—

1. The combination, with a supporting revoluble shaft, of two or more circular-saw hangers composed of tubular sleeves formed to telescope at their approaching ends and circular saws secured to one end of the sections, substantially as described.

2. In a circular-saw gang-mill, the combination of the shaft A, the tubular sleeves B and C C, mounted on the shaft and formed to telescope at their approaching ends, and the saw secured to the end of each of the sleeves, substantially as described.

In witness whereof I affix my signature in the presence of two attesting witnesses.

GEO. E. ELLIOTT.

Attest:
 JOHN J. MCKINNEY,
 MARK L. MCLAUGHLIN.